May 8, 1962   J. N. HELLER   3,033,030
AIR CLEANER CONDITION INDICATOR
Filed June 17, 1960
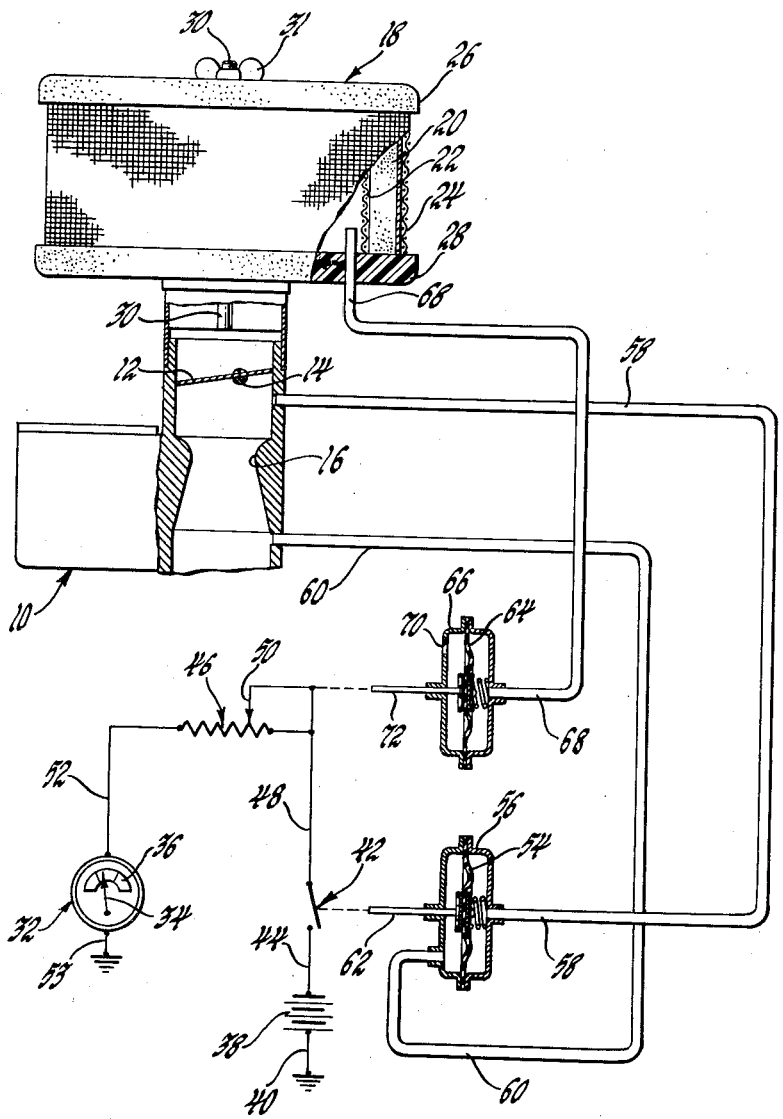
INVENTOR.
BY  Joseph N. Heller
E. W. Christen
ATTORNEY

United States Patent Office 3,033,030
Patented May 8, 1962

3,033,030
AIR CLEANER CONDITION INDICATOR
Joseph N. Heller, Flint, Mich., assignor to General Motors Corporation, Detroit, Mich., a corporation of Delaware
Filed June 17, 1960, Ser. No. 36,812
2 Claims. (Cl. 73—118)

This invention relates to a device for indicating the condition of an air cleaner mounted on the induction system of an engine.

In motor vehicle manufacture, an internal combustion engine is provided having an induction system for drawing in atmospheric air, mixing the air with fuel in a carbureting device, and passing the air to the engine cylinders. It is desirable that the air entering the induction system be as clean as possible, since impurities in the air adversely affect the combustion and have a deleterious effect on the engine itself. In order to permit clean air to enter the induction system, an air cleaner is generally used, including a filter element mounted over the carburetor or induction system. The air filter element is designed to stop the impurities in the air as the air passes therethrough. Over a period of time, it is easily seen that the air filter may become clogged with dirt and foreign material which would greatly decrease the flow rate of air through the air cleaner.

Devices have been provided in the past for indicating the conditon of a filter element in an air cleaner, utilizing audible signals, or the like, which are objectionable to the user. Such devices have been complicated and difficult to install, thus being expensive when used on a production basis.

The device in which this invention is embodied comprises, generally, an indicator system for measuring the flow through the air cleaner and providing a visible indication of the condition of the filter element. A pressure operated switch is provided in the indicator circuit which permits operability during a predetermined range of flow rates through the induction system, and a variable resistor, also pressure actuated, causes the indicator to show the condition of the air filter during the predetermined range of flow rates.

With a device of this nature a visible, rather than audible, signal is provided whic his not particularly objectionable to the vehicle operator, and gives a positive and quick indication of the air cleaner at all times. The device is relatively inexpensive to manufacture and install and is uncomplicated.

These and other advantages will become more apparent from the following description and drawing in which:

The single FIGURE illustrates an induction system for an engine with an air cleaner attached and having an indicator device capable of operation when the filter unit becomes sufficiently filled with foreign materials to require changing.

Referring more particularly to the drawings, the engine induction system is shown to include a carburetor, illustrated generally by the numeral 10, having the usual throttle valve 12 operable from an accelerator pedal inside the vehicle. Throttle valve 12 is disposed on a pivot shaft 14, connected by a suitable linkage to the accelerator pedal. Carburetor 10 includes a venturi section 16 through which the air passes on its way to the engine cylinder.

An air cleaning device, illustrated generally by the numeral 18, is mounted above the carburetor 10 and includes a filter element 20 which may be of pleated paper or any other suitable construction. Inner and outer screens, 22 and 24 respectively, protect the filter element 20. Upper and lower plates 26 and 28 clamp the filter element therebetween, and may be made of any suitable material, such as rubber or plastic. Further, the plates 26 and 28 may have the filter element 20 and screens 22 and 24 molded therein providing a complete assembly. The entire assembly is secured to the carburetor 10 by means of an attaching bolt 30 and a wing nut 31. Any other suitable means may be provided to secure the air cleaner 18 to the carburetor 10.

An indicator gage, illustrated generally by the numeral 32, is conveniently placed in the vehicle where it may be visible to the vehicle operator. The indicating device 32 comprises a needle 34 and a scale 36, the position of the needle on the scale indicating the condition of the air cleaner as will be hereinafter more fully described.

Indicator 32 is electrically actuated, the power source 38 being any suitable source such as the usual vehicle battery or generator. The power source 38 is connected to ground by electrical conduit 40 and is connected to a switch, illustrated generally by the numeral 42, by conduit 44. Switch 42 is placed in series with a variable resistor, illustrated generally by the numeral 46, through a conduit 48 and slide 50, and the variable resistor 46 is in series with the switch 42 and the indicator 32 being connected to the indicator through electrical conduit 52. Indicator 32 is connected to ground through conduit 53 to complete the circuit.

Switch 42 is actuated by a pressure sensitive device which may comprise a diaphragm 54 suitably mounted in a casing 56. The diaphragm 54 is movable in accordance with the pressure differential across the venturi 16 in the induction system, pressure conduit 58 leading from above the venturi 16 to one side of the diaphragm 54 in the casing 56 and pressure conduit 60 leading from below the venturi 16 to the opposite side of the diaphragm 54 in the casing 56. It may be seen that the pressure differential across the venturi will actuate the diaphragm in one direction or the other, thus actuating the switch 42 through a suitable connection, such as rod 62. The vacuum device and switch 42 are so constructed as to close switch 42 during a predetermined range of flow rates, such as between 70 and 90 cubic feet per minute through the induction system. It is possible to utilize any other range of flow rates, depending on the time at which it is desirable to indicate the condition of the air cleaner.

The variable resistor 46 is also actuated by a pressure responsive device which may comprise a diaphragm 64 secured in a casing 66. Diaphragm 64 is responsible to the pressure differential between the air flow at the outlet of the filter element 20 and the atmosphere. Conduit 68 leads from the inner chamber of the air cleaner 18, which is on the outlet side of the filter element 20, and communicates with one side of diaphragm 64. Conduit 68 may lead from any spot between the filter outlet and the upper end of the venturi 16. A port 70 in the casing 66 communicates with the opposite side of diaphragm 64, thus providing atmospheric pressure on that side of the diaphragm 64. It may be seen that the diaphragm actuates the slide 50 of the variable resistance, as by the rod 72, in accordance with the difference of pressure on opposite sides of the filter element 20.

In operation, it may be seen that when the flow rate through the induction system is within the predetermined range the pressure difference across the venturi 16 will cause normally open switch 42 to close. This completes the circuit between the power source 38 and the indicator 32 through the variable resistance 46. The amount of resistance is determined by the pressure differential across the filter element 20 in such a manner that at low flow, or little pressure difference, a certain value of resistance will be placed in the indicator circuit and at high flow, and high pressure differential, a different value of resistance will be placed in the circuit. The indicator needle 34 and scale 36 are so calibrated as to indicate the necessity of changing the filter element when the flow rate is low and to indicate that the air cleaner element is sufficiently clean when the flow rate is high.

A device of this nature is also operable with other types of air cleaner assemblies, such as the commonly known snorkel type. If used with such an assembly, the pressure conduit to one side of the variable resistor diaphragm could be placed in the snorkel tube and the opposite side of the diaphragm communicating with the atmosphere. This would provide a suitable pressure differential to actuate the variable resistor.

Thus it may be seen that a suitable device is provided for measuring the condition of an air cleaner assembly during operation of an engine. The device is relatively simple and uncomplicated, easy to manufacture and install, and does not present an objectionable signal to the vehicle user.

What is claimed:

1. A device for determining the condition of an air cleaner mounted on an engine having an air induction system including a venturi and comprising a power source, an indicator, switch means in series with said indicator and adapted to connect said indicator with said power source, means responsive to the pressure differential across said venturi actuating said switch during a predetermined range of flow rates in said induction system, variable resistance means in series with said indicator, and pressure responsive means varying said resistance means in accordance wtih the pressure differential between the outlet of said air cleaner and the atmosphere, said variable resistance causing said indicator to show the condition of said air cleaner.

2. A device for determining the condition of an air cleaner mounted on an engine having an air induction system including a venturi and comprising a power source, an indicator connected to said power source, switch means between said indicator and said power source, pressure responsive means operably connected to said switch means and responsive to the pressure drop across said venturi during a predetermined range of flow rates in said induction system for actuating said switch means during said range, a variable resistor in series with said indicator and said switch means, pressure responsive means operably connected to said variable resistor and responsive to the pressure differential betwen the outlet of said air cleaner and the atmosphere to vary said resistor relative to the amount of said pressure differential, said switch means and said variable resistor when actuated causing said indicator to show the condition of said air cleaner.

References Cited in the file of this patent

UNITED STATES PATENTS

| | | |
|---|---|---|
| 1,662,529 | McKinley | Mar. 13, 1928 |
| 2,104,047 | Long | Jan. 4, 1938 |